(12) United States Patent
Harrington et al.

(10) Patent No.: US 11,843,944 B2
(45) Date of Patent: Dec. 12, 2023

(54) SATELLITE TERMINAL IP RADIO MOCA LINK SECURITY

(71) Applicant: HUGHES NETWORK SYSTEMS, LLC, Germantown, MD (US)

(72) Inventors: Emanuel Harrington, Bowie, MD (US); David McLaurin, San Jose, CA (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 55 days.

(21) Appl. No.: 17/139,278

(22) Filed: Dec. 31, 2020

(65) Prior Publication Data

US 2022/0210637 A1    Jun. 30, 2022

(51) Int. Cl.
*H04W 12/06* (2021.01)
*H04W 12/041* (2021.01)
*H04B 7/185* (2006.01)

(52) U.S. Cl.
CPC ........ *H04W 12/06* (2013.01); *H04B 7/18593* (2013.01); *H04W 12/041* (2021.01)

(58) Field of Classification Search
CPC . H04W 12/06; H04W 12/041; H04B 7/18593
See application file for complete search history.

(56) References Cited

U.S. PATENT DOCUMENTS

| | | | |
|---|---|---|---|
| 6,343,205 B1* | 1/2002 | Threadgill | H04B 7/18578 455/12.1 |
| 7,136,999 B1* | 11/2006 | Griffiths | H04L 63/08 713/168 |
| 9,277,402 B2* | 3/2016 | Husted | H04L 63/068 |
| 9,781,756 B2* | 10/2017 | Palin | H04W 12/50 |
| 9,843,379 B2* | 12/2017 | Krafft | H04N 7/20 |
| 2005/0198673 A1* | 9/2005 | Kit | H04N 21/4181 725/63 |
| 2008/0045146 A1* | 2/2008 | Wahlberg | H04B 7/18573 455/12.1 |
| 2017/0353233 A1 | 12/2017 | Qin et al. | |
| 2018/0288614 A1* | 10/2018 | Zaks | H04L 63/0428 |

FOREIGN PATENT DOCUMENTS

EP    2495971    9/2012

OTHER PUBLICATIONS

International Search Report and Written Opinion dated Apr. 20, 2022 for International Application No. PCT/US/2021/065346.

* cited by examiner

*Primary Examiner* — Meng Li
*Assistant Examiner* — Lydia L Noel
(74) *Attorney, Agent, or Firm* — Sheppard, Mullin, Richter & Hampton LLP

(57) ABSTRACT

Some implementations of the disclosure are directed to preventing unauthorized transmissions of an outdoor IP Radio by an unauthorized user tapping the connection between an indoor unit and the outdoor IP Radio. In one implementation, a method comprises: initializing, over an interfacility link (IFL) connecting an indoor unit of a satellite terminal and an outdoor Internet Protocol (IP) Radio of the satellite terminal, a communication link between the indoor unit and the outdoor IP Radio; authenticating, using the indoor unit and the outdoor IP Radio, the communication link between the indoor unit and the outdoor IP radio; and after authenticating the communication link, providing satellite network service to the indoor unit via the outdoor IP Radio.

20 Claims, 5 Drawing Sheets

400

410 Initializing, Over An IFL Connecting An Indoor Unit Of A Satellite Terminal And An Outdoor IP Radio Of The Satellite Terminal, A Communication Link Between The Indoor Unit And The Outdoor IP Radio;

420 Authenticating, Using The Indoor Unit And The Outdoor IP Radio, The Communication Link Between The Indoor Unit And The Outdoor IP Radio

430 After Authenticating The Communication Link, Providing Satellite Network Service To The Indoor Unit Via The Outdoor IP Radio

FIG. 3

SATELLITE TERMINAL IP RADIO MOCA LINK SECURITY

SUMMARY

Implementations of the disclosure are directed to preventing unauthorized transmissions of an outdoor Internet Protocol (IP) Radio by an unauthorized user tapping the connection between an indoor unit and the outdoor IP Radio.

In one embodiment, a method comprises: initializing, over an interfacility link (IFL) connecting an indoor unit of a satellite terminal and an outdoor IP Radio of the satellite terminal, a communication link between the indoor unit and the outdoor IP Radio; authenticating, using the indoor unit and the outdoor IP Radio, the communication link between the indoor unit and the outdoor IP radio; and after authenticating the communication link, providing satellite network service to the indoor unit via the outdoor IP Radio.

In some implementations, authenticating the communication link, comprises: authenticating, using one or more security keys stored at the indoor unit and the outdoor IP Radio, the communication link between the indoor unit and the outdoor IP Radio. In some implementations, the one or more security keys are generated by a network management system (NMS) of a satellite communications network; and the method further comprises: after the one or more keys are generated by the NMS, receiving and storing, at the outdoor IP Radio and the indoor unit, the one or more security keys.

In some implementations, receiving, at the outdoor IP Radio and the indoor unit, the one or more security keys, comprises: receiving, at the outdoor IP Radio, a modulated and encoded signal transmitted over an outroute of the satellite communications network; demodulating and decoding the signal at the outdoor IP Radio to extract the one or more security keys; and transmitting, over the IFL, the one or more security keys from the outdoor IP Radio to the indoor unit.

In some implementations, storing, at the outdoor IP Radio and the indoor unit, the one or more security keys, comprises: storing, at the outdoor IP Radio and the indoor unit, the one or more security keys at the time that the satellite terminal is commissioned and installed.

In some implementations, authenticating the communication link, comprises: pinging, over the IFL, using the outdoor IP Radio, the indoor unit; in response to pinging the indoor unit, receiving, at the outdoor IP Radio, a response message from the indoor unit; and confirming, at the outdoor IP Radio, using at least the response message, that the indoor unit is authorized to receive the satellite network service via the outdoor IP Radio. In some implementations, confirming, at the outdoor IP Radio, using at least the response message, that the indoor unit is authorized to receive the satellite network service via the outdoor IP Radio, comprises: confirming, using at least the response message and one or more security keys stored at the outdoor IP Radio, that the indoor unit is authorized to receive the satellite network service via the outdoor IP Radio.

In some implementations, authenticating the communication link, comprises: authenticating the communication link during power up of the indoor unit and the outdoor IP Radio.

In some implementations, authenticating the communication link, comprises: periodically authenticating the communication link between the indoor unit and the outdoor IP Radio.

In some implementations, the IFL is a coaxial cable link.

In one embodiment, a satellite terminal comprises: an indoor unit; an outdoor IP Radio, one or more processors; and one or more non-transitory computer-readable mediums having executable instructions stored thereon that, when executed by the one or more processors, cause the satellite terminal to perform operations, comprising: initializing, over an IFL connecting the indoor unit and the outdoor IP Radio, a communication link between the indoor unit and the outdoor IP Radio; authenticating, using the indoor unit and the outdoor IP Radio, the communication link between the indoor unit and the outdoor IP radio; and after authenticating the communication link, providing satellite network service to the indoor unit via the outdoor IP Radio. In some implementations, the satellite terminal is a very small aperture terminal (VSAT).

In one embodiment, an outdoor IP Radio comprises: one or more processors; and one or more non-transitory computer-readable mediums having executable instructions stored thereon that, when executed by the one or more processors, cause the outdoor IP Radio to perform operations, comprising: initializing, over an interfacility link (IFL) connecting the outdoor IP Radio to an indoor unit of the satellite terminal, a communication link between the outdoor IP Radio and the indoor unit; authenticating the communication link between the indoor unit and the outdoor IP radio; and after authenticating the communication link, providing satellite network service to the indoor unit.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 3 is an operational flow diagram illustrating an example method that may be implemented at satellite terminal to secure a cable link between an indoor unit and IP Radio, in accordance with implementations of the disclosure.

Figure 1:
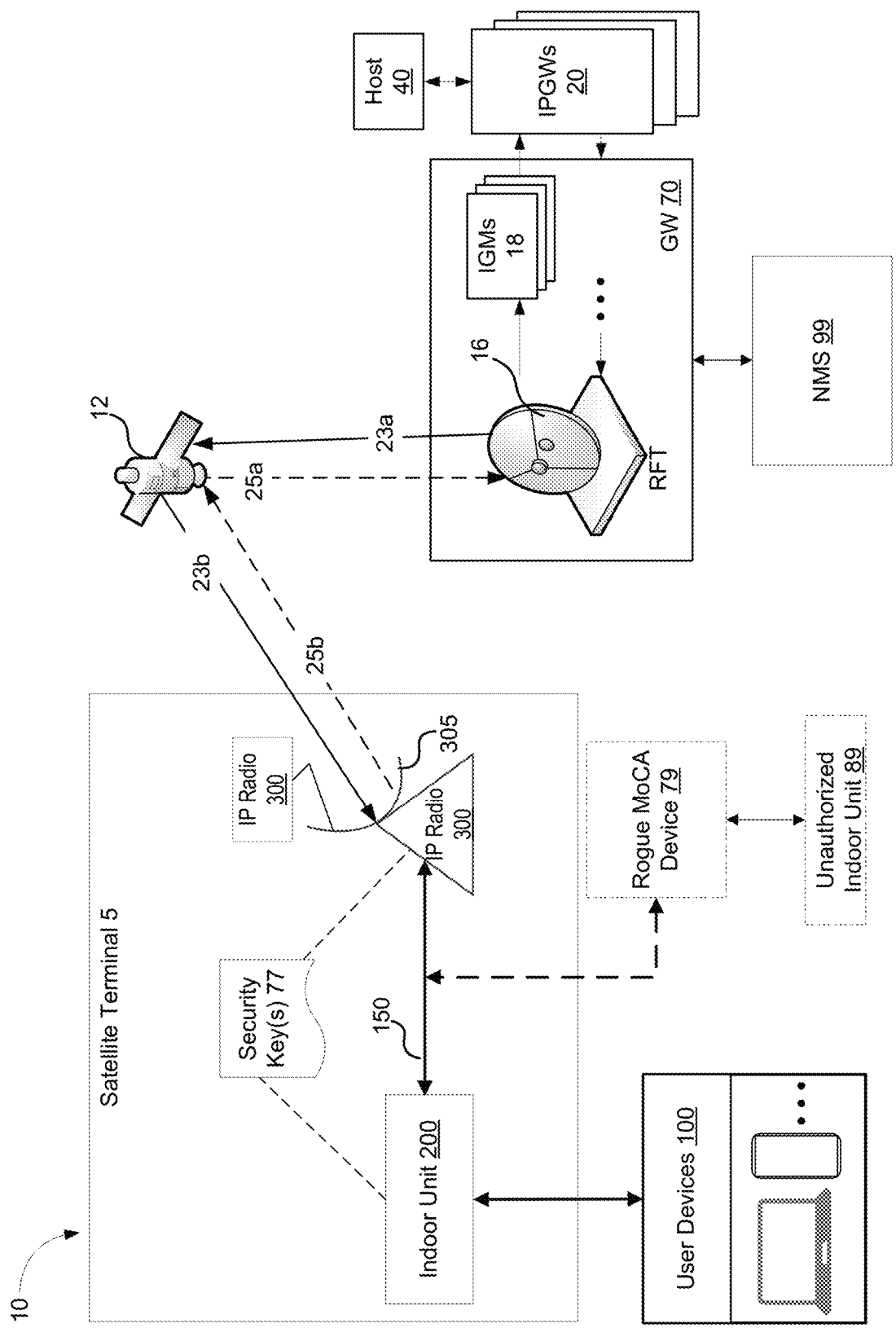
FIG. 1 illustrates an example satellite network comprising a satellite terminal including an indoor unit and outdoor IP Radio with which the MoCA link security techniques described herein may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

In some satellite communication systems, a satellite terminal of a subscribing user includes a satellite indoor unit that communicates with an outdoor Internet Protocol (IP) Radio connected to a satellite antenna. The satellite indoor unit may provide WIFI network access to devices associated with the household of the user. The WIFI network may be secured via a WIFI network security key that prevents unauthorized devices from stealing network service from the subscriber by connecting to and communicating over the same indoor unit. The security key may reside locally to the indoor unit's main processor or a processor dedicated to processing Wi-Fi traffic.

While unauthorized usage of service is typically associated with an unauthorized device gaining access to the subscribing user's WIFI network to allow transmission and reception over the satellite communication link, unauthorized users may also gain access to the satellite communication link and steal satellite service by tapping the coaxial cable link between the user's indoor unit and the outdoor IP Radio coupled to the satellite dish. For example, an unauthorized user could potentially insert a switch between the coaxial cable link and directly wire their own unauthorized indoor unit to the switch. As another example, an unauthorized user could potentially insert a device between the coaxial cable link that broadcasts a new WIFI network that provides access to the subscribing user's satellite service. In these scenarios, the unauthorized user could potentially steal service with the paying customer not being able to use the IP Radio; or the unauthorized device could strategically switch connections between the authorized indoor unit and an unauthorized indoor unit such that the authorized user never detects that their service is being shared. As such, satellite terminal systems provided to subscribing users may not be designed to prevent or deter tapping a wired link between an authorized user's indoor equipment and outdoor equipment.

Implementations of the disclosure are directed to preventing unauthorized transmissions of an outdoor IP Radio by an unauthorized user tapping the connection between an indoor unit and the outdoor IP Radio. In accordance with implementations of the disclosure, the cable link (e.g., Multimedia over Coax Alliance (MoCA) cable link) between a subscribing user's indoor unit and the outdoor IP Radio may be secured during initialization of the communication link between the indoor and outdoor equipment. For example, one or more security keys may be exchanged by the indoor unit and the outdoor IP Radio to qualify authorized communications between the devices. In addition to preventing unauthorized transmissions of an outdoor IP radio, the techniques described herein may be implemented without degrading network performance during operation by securing the communication link between indoor equipment and outdoor equipment during startup communications.

FIG. 1 illustrates an example satellite network 10 comprising a satellite terminal 5 including an indoor unit 200 and outdoor IP Radio 300 with which the MoCA link security techniques described herein may be implemented. Satellite network 10 in this example includes a satellite 12, Gateway Earth Station (GW) 70, one or more IP gateways (IPGWs) 20, and a satellite terminal 5. GW 70 may be configured as a high capacity earth station with connectivity to ground telecommunications infrastructure. A network management system (NMS) 99 may be communicatively coupled to GW 70 over a network and direct its operation. NMS 99 may be located remotely from GW 70 or co-located with GW 70. NMS 99 may manage satellite network and subscriber services.

GW 70 includes one or more radio frequency terminals (RFT) 16 that includes the physical equipment responsible for sending and receiving signals to and from satellite 12, and may provide an interface for GW 70. GW 70 may also include one or more inroute group managers (IGMs) 18 that function as bandwidth controllers running bandwidth allocation algorithms. The IGMs 18 may manage bandwidth of satellite terminal 5 and other terminals in the form of inroute groups (IGs), based in part on bandwidth demand requests from the remote terminals.

Although a single satellite 12 is shown in this example, it should be appreciated that satellite network 10 may be a multi-satellite network where a particular satellite services a satellite terminal 5 depending on the present location of the satellite terminal 5 and present location of the spotbeam of the satellite. Additionally, although a single GW 70 and satellite terminal 5 are depicted in this example, it should be appreciated that satellite network 10 may comprise multiple GWs and multiple satellite terminals.

Feeder links may carry data between RFT 16 and satellite 12, and may include: forward uplink 23a for transmitting data from RFT 16 to satellite 12; and return downlink 25a for transmitting data from satellite 12 to RFT 16. User links may carry data between satellite 12 and satellite terminal 5, and may include: return uplink 25b for transmitting data from satellite terminal 5 to satellite 12; and forward downlinks 23b for transmitting data from satellite 12 to terminal 5. Forward uplink 23a and forward downlink 23b may form an outroute, and return uplink 25b and return downlink 25a may form an inroute. Satellite 12 may transmit satellite signals corresponding to a user spot beam having a coverage area that may be in the geographic region in which terminal 5 and other satellite terminals are located and are able to connect to satellite 12.

Satellite 12 may be any suitable communication satellite. For example, satellite 12 may be a bent-pipe design geostationary satellite, which can accommodate innovations and variations in transmission parameters, operating in the Ka-band, Ku-band or C-band. Satellite 12 may use one or more spot beams as well as frequency and polarization reuse to maximize the total capacity of satellite network 10. Signals passing through satellite 12 in the forward direction may be based on the DVB-S2 standard (ETSI EN 302 307) or DVB-S2X standard using signal constellations up to and including at least 256-APSK. The signals intended to pass through satellite in the return direction from satellite terminals 5 may be based on the Internet Protocol over Satellite (IPoS) standard (ETSI TS 102 354). Other suitable signal types may also be used in either direction, including, for example higher data rate variations of DVB-S2 or DVB-RCS.

IPGWs 20 may include the set of layer 2 and layer 3 packet processing equipment between GW 70 and the Internet. In some implementations, IPGW may be collocated with GW 70. In other implementations, IPGWs 20 may be provisioned at another location. In some implementations, multiple IPGWs may be connected to GW 70. IPGWs 20 may be an ingress portion of a local network. IP traffic, including TCP traffic originating from a host 40 from the internet, may enter GW 70 through IPGWs 20.

Data from an Internet intended for a satellite terminal 5 may be in the form of IP packets, including TCP packets and UDP packets, or any other suitable IP packets, and may enter GW 70 at any one of IPGWs 20. The IP packets may be processed and multiplexed by GW 70 along with IP packets from other IPGWs, where the IPGWs may or may not have the same service capabilities and relative priorities. The IP packets may be transmitted to satellite 12 on forward uplink 23a using the air interface provided by RFT 16. Satellite 12 may them transmit the IP packet to the satellite terminal 5 using forward downlink 23b. Similarly, IP packets may enter the network via satellite terminal 5, be processed by a satellite terminal 5, and transmitted to satellite 12 on return uplink 25b. Satellite 12 may then send these inroute IP packets to GW 70 using return downlink 25a.

A satellite terminal 5 connects to the Internet or other network through satellite 12 and IPGWs 20/GW 70, and provides access to the Internet or other network to one or more user devices 100 that connect to satellite terminal 5. Satellite terminal 5 includes an indoor unit 200 communicatively coupled to an IP Radio 300 via coaxial cable link 150. The indoor unit 200 may function as an Internet modem. The modem may include an integrated router in some implementations. Communications over coaxial cable link 150 may be in accordance with the Multimedia over Coax Alliance (MoCA) protocol. The IP Radio may be a component of an outdoor unit of satellite terminal 5 that also includes an antenna 305 coupled to IP Radio 300. Antenna 305 transmits signals to satellite 12 via uplink 25b and receives signals from satellite 12 via downlink 23b. Antenna 305 may be any suitable antenna design (e.g., small aperture parabolic antenna design) configured to transmit and receive electromagnetic signals to and from one or more satellites.

The satellite terminal 5 may be configured as a very-small-aperture terminal (VSAT). In some implementations, the satellite terminal 5 may be a satellite terminal of a subscriber's home or premise. In some implementations, the satellite terminal 5 may be implemented as a community WiFi terminal that may provide service to multiple households or to users visiting a community access site (e.g., a coffee shop).

Functions that may be performed by network equipment of satellite terminal 5 may include, for example, providing IP address and other assignments via the dynamic host configuration protocol (DHCP), and responding to requests for renewal and updates; responding to Address Resolution Protocol (ARP) requests for any IP address on the local subnet; carrying unicast IP (TCP and UDP) packets to the space link via cable 150; carrying multicast UDP/IP packets to the space link if enabled; accepting IP packets directed to its local IP address (e.g., for WebUI); and other functions.

As depicted in the example of FIG. 1, a rogue MoCA device 79 (e.g., switch) attempts to tap coaxial cable link 150 to provide satellite network service to an unauthorized indoor unit 89. For example, the rogue MoCA device 79 may be physically connected outdoors in between the indoor unit 200 and IP radio 300. The rogue MoCA device 79 may connect to the end of coaxial cable link 150 intended for IP Radio 300, and provide a second coaxial cable link connection to IP Radio 300. In this manner, the device 79 may attempt to switch connections between the authorized indoor unit 200 and unauthorized indoor unit 89 such that an authorized subscriber associated with satellite terminal 5 never detects that their service is being shared.

In accordance with implementations of the disclosure, further discussed below, communications between indoor unit 200 and IP Radio 300 over coaxial cable link 150 may be authenticated and secured when the connection is initialized (e.g., during installation of satellite terminal 5). In this manner, even if rogue MoCA device taps the communication link 150, the unauthorized indoor unit 89 is prevented from transmitting or receiving data over the satellite communication network via IP Radio 300 and antenna 305.

Figure 2:
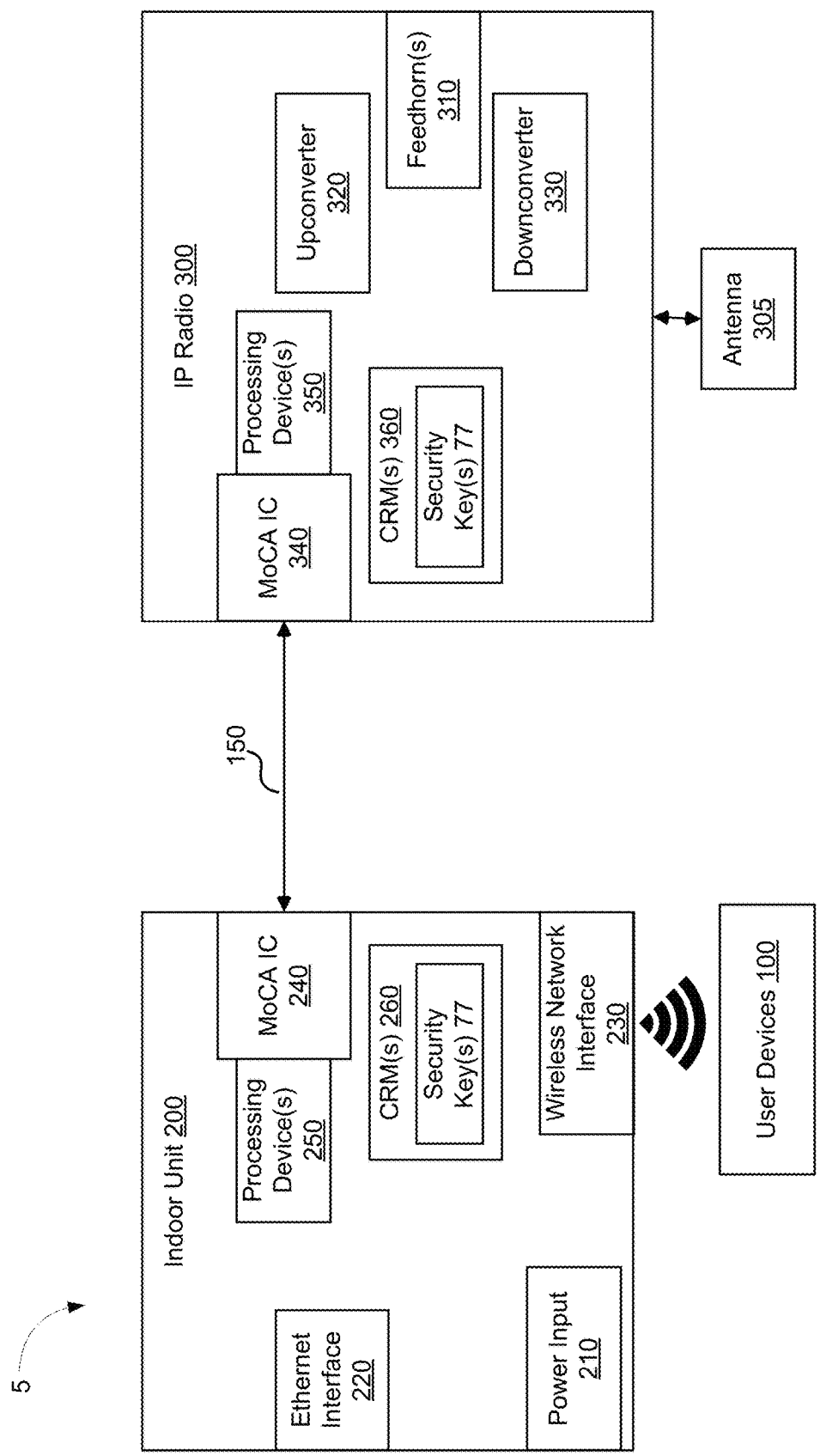
FIG. 2 is a block diagram illustrating some components of indoor unit and IP radio of a satellite terminal, in accordance with implementations of the disclosure.

FIG. 2 is a block diagram illustrating some components of indoor unit 200 and IP radio 300 of a satellite terminal 5, in accordance with implementations of the disclosure. As depicted, indoor unit 200 may include a power input 210 to receive energy to power indoor unit 200 and outdoor IP Radio 300, an Ethernet interface 220 including one or more Ethernet ports, wireless network interface 230, a MoCA integrated circuit (IC) 240, one or more processing devices 250, and one or more computer-readable mediums (CRM) 260.

In the illustrated example, indoor unit 200 functions as a router. It includes a wireless network interface 230 to broadcast a WIFI network that user devices 100 wirelessly connect to. The one or more user devices 100 may include any user device that is providing access to the Internet or other network via a satellite modem of terminal 5 (e.g., a satellite modem of IP Radio 300). For example, the one or more user devices 100 may be a laptop, a desktop computer, a router, a tablet, a smartphone, a smart television, a smart home device, etc. A user device 100 may transmit packets to or receive packets from the modem. The user device 100 may wirelessly couple to the indoor unit 200 (e.g., over WIFI) or directly couple to the indoor unit 200 over an ethernet cable that couples to a port of Ethernet interface 220. In alternative implementations, indoor unit 200 does not have an integrated router, and instead may operate as a switch that communicatively couples to a separate router that may provide WIFI access and/or ethernet ports.

The MoCA IC 240 enables communication over a coaxial cable 150 using the MoCA standard. The MoCA IC 240 may be implemented on a suitable chipset that supports coaxial cable transmissions to/from indoor unit 200 using the MoCA protocol. For example, the chipset may support MoCA 1.0, MoCA 2.0, MoCA 2.5, MoCA 3.0, etc. Example cable types that may be used with the IFL link 150 include RG-6 dual shield, RG-6 quad shield, and RG-11.

As depicted, IP Radio 300 may include one or more feedhorns 310, upconverter 320, and downconverter 330, a MoCA IC 340, one or more processing devices 350, and one or more CRMs 360.

The one or more feed horns 310 may be configured to convey uplink signal 25b and downlink signal 23b to upconverter 320 and downconverter 330, respectively. In implementations where a single feed horn 310 conveys both uplink and downlink signals, IP radio 300 may also include an orthomode transducer (OMT) attached to the feed horn. In such implementations, the OMT may combine or separate the uplink signal and the downlink signal (e.g., by orthogonally polarizing the uplink signal and downlink signal such that the two signals are at 90° to each other).

Upconverter 320 may be configured to upconvert and amplify signals received from the indoor unit 200 over coaxial cable 150. The signal may be frequency upconverted such that it falls within one of the radio spectrum bands identified for satellite communication, such as the $K_u$ band, $K_a$ band, C band, or other suitable radio frequency band. The frequency upconverted (and amplified) signal may be sent via a feed horn 310 to the antenna 305, which may focus the signal into a narrow beam for transmission to a satellite. In some implementations, the upconverter 320 may be a block upconverter (BUC).

Downconverter 330 may be configured to receive a downlink signal 23b relayed by antenna 305 through a feed horn 310. The downconverter 330 may combine several different components, such as a low-noise amplifier, local oscillator, and frequency mixer, to convert the downlink signal into a range of intermediate frequencies (IF) for carrying to the received indoor unit 200 using coaxial cable 150. In some implementations, the downconverter 330 may be a low noise block. In implementations, some or all of feedhorn(s) 310, upconverter 320, and downconverter 330, may be mounted on antenna 305.

The MoCA IC 340 enables communication over a coaxial cable 150 using the MoCA standard. The MoCA IC 340 may be implemented on a suitable chipset that supports coaxial cable transmissions to/from indoor IP Radio 300 using the MoCA protocol. For example, the chipset may support MoCA 1.0, MoCA 2.0, MoCA 2.5, MoCA 3.0, etc. In alternative implementations, indoor unit 200 and IP Radio 300 may each incorporate some other interfacility link (IFL) IC for enabling communication over a cable. For example, in alternative implementations an Ethernet cable or fiber optic cable may be used to couple the indoor unit 200 and IP Radio 300.

As discussed above, conventional satellite terminals include no explicit authentication of service between the indoor unit 200 and IP Radio 300 when communicating over the coaxial cable 150. As such, without any additional security measures, there exists a possibility that a bad actor could effectively "steal" or tap off service from a customer's IP Radio 300 with a compatible indoor MoCA bridge terminal (e.g., using device 79 and unauthorized indoor unit 89) that connects to coaxial cable 150.

To avoid this misuse, satellite terminal 5 may establish a secured connection between indoor unit 200 and IP Radio 300 by implementing a handshake authentication process between indoor unit 200 and IP Radio 300, after both components are powered up. During this authentication process, processing devices 250, 350 of indoor unit 200 and IP radio 300 may exchange one or more security key(s) 77 that may be stored in CRM(s) 260 and 360, respectively. With an exclusive key exchange, an additional layer of confirmation of interoperability between distributed hardware terminals may be added. Following authentication, communications between indoor unit 200 and IP Radio 300 may be authorized. In this instance, by virtue of implementing authentication during startup communications (e.g., during device powerup, after the devices are connected via coaxial cable link 150), it is expected that latency will only be added to startup communications and not impede subsequent traffic between the indoor unit 200 and IP Radio 300. As such, the addition is not expected to limit overall link throughput rates once a "partner" has been verified.

In some implementations to further secure the connection between indoor unit 200 and IP Radio 300, a trusted execution environment (TEE) may be configured at the indoor unit 200 and/or IP Radio 300 to store and maintain the security key(s) 77. The TEE may be a secure area of processing device(s) 250 and/or 250.

FIG. 3 is an operational flow diagram illustrating an example method 400 that may be implemented at satellite terminal 5 to secure a cable link between an outdoor unit 200 and IP Radio 300, in accordance with implementations of the disclosure. In implementations, method 400 may be implemented by a processing device 250 of indoor unit 200 executing instructions stored in a CRM 260 of indoor unit 200, and/or by a processing device 350 of IP Radio 300 executing instructions stored in a CRM 360 of IP Radio 300. Prior to performing the operations of method 400, the IP Radio may be activated by an NMS. For example, an IP Radio 300 may communicate with and be activated by NMS 99 over the satellite link.

Operation 410 includes: initializing, over an IFL cable connecting the indoor unit of the satellite terminal and the outdoor IP Radio of the satellite terminal, a communication link between the indoor unit and the outdoor IP Radio. The communication link may be initialized during power up of the devices. The IFL cable may be a coaxial cable, and the satellite terminal's indoor unit and the outdoor IP Radio may communicate over the coaxial cable in accordance with the MoCA standard.

Operation 420 includes: authenticating, using the indoor unit and the outdoor IP Radio, the communication link between the indoor unit and the outdoor IP radio.

In some implementations, the communication link is authenticated using one or more security keys or some other secure material made available to both devices. The one or more security keys may include a public key and a corresponding private key that may be used to authenticate the indoor unit to the IP Radio. Prior to authentication, the keys may have been exchanged between the devices to enable symmetric key encryption and secure communications. The one or more security keys may be stored at each device (e.g., keys 77 stored at CRM 260 and CRM 360).

The processing devices of the indoor unit and IP Radio (e.g., processing devices 250, 350) may communicate with the security keys at power up to establish authentication. In some implementations, the IP Radio may ping the indoor unit for a security key match and receive a message from the indoor unit to confirm if there is a match. For example, the message may be encrypted using one of the security keys, and decrypted using another one of the keys. If there is a match, the IP Radio may transmit an acknowledgement message and communication between the devices may continue. Otherwise, the IP Radio may ignore transmissions from the indoor unit and/or not respond with an acknowledgement. As such, even if a rogue indoor unit successfully taps the cable link between the indoor unit and outdoor IP Radio, it may not gain access to the satellite network via the IP Radio.

To avoid network interruptions or degradation (e.g., latency), the authentication need not be validated on a burst to burst basis. In some implementations, authentication occurs only during power up of the indoor unit and IP Radio, and/or after a sustained interruption of the connection (e.g., coaxial cable link) between the devices. In some implementations, for increased security, periodic authentication may be done (e.g., every hour, day, or week). The periodic authentication may be scheduled during times least likely to disrupt service for the subscribing user.

Prior to authentication, the one or more security keys may be generated by an NMS (e.g., NMS 99). In some implementations the one or more security keys generated by the NMS are transmitted to the IP radio over a satellite outroute. The IP Radio may then provide the one or more security keys to the indoor unit. For example, satellite antenna 305 may receive, over downlink 23b, a modulated signal encoded with the one or more security keys. In other implementations, the one or more security keys may be loaded by an installer of the satellite terminal 5 after they are generated by the NMS 99. The NMS may itself maintain a record (e.g., database or other data structure) of all keys and their associated satellite terminals.

In some implementations, to ensure the security keys are not obtained by a rogue device or user, the security keys are assigned to and stored at the indoor unit and IP Radio only at the time of commissioning and installing the satellite terminal, e.g., when the indoor unit and IP Radio are "married" or linked together. If the indoor unit or IP Radio are swapped out as part of a maintenance or upgrade event, the NMS may again provide a new set of unique keys that are stored and used by the new indoor unit and/or new IP Radio.

Operation 430 includes: after authenticating the communication link, providing satellite network service to the indoor unit via the outdoor IP Radio.

Figure 4:
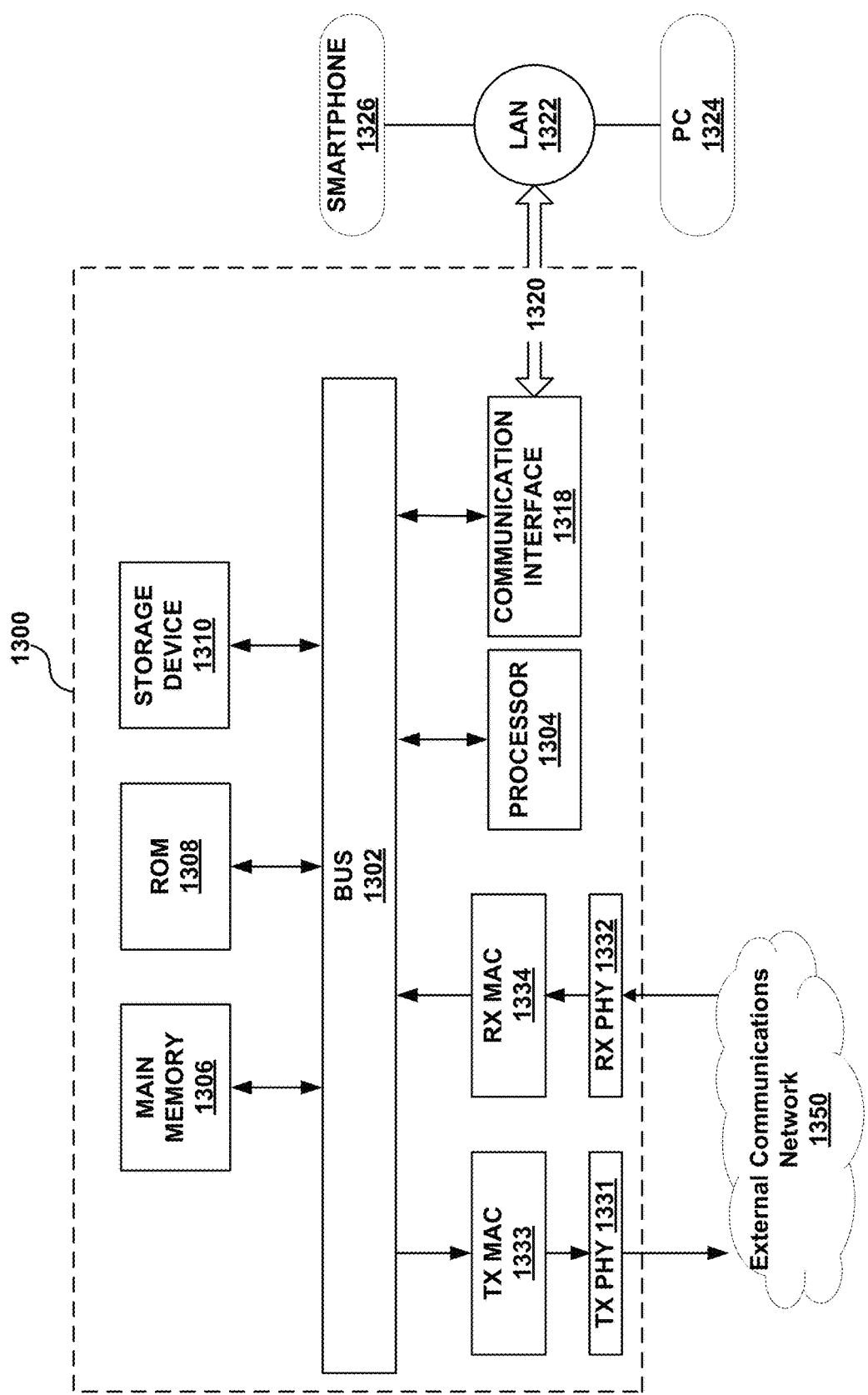
FIG. 4 illustrates a computer system/communication device upon which example embodiments according to the present disclosure can be implemented.

FIG. 4 illustrates a computer system/communication device 1300 upon which example embodiments according to the present disclosure can be implemented. Computer system 1300 can include a bus 1302 or other communication mechanism for communicating information, and a processor 1304 coupled to bus 1302 for processing information. Computer system 1300 may also include main memory 1306, such as a random access memory (RAM) or other dynamic storage device, coupled to bus 1302 for storing information and instructions to be executed by processor 1304. Main memory 1306 can also be used for storing temporary variables or other intermediate information during execution of instructions to be executed by processor 1304. Computer system 1300 may further include a read only memory (ROM) 1308 or other static storage device coupled to bus 1302 for storing static information and instructions for processor 1304. A storage device 1310, such as a magnetic disk or optical disk, may additionally be coupled to bus 1302 for storing information and instructions.

According to one embodiment of the disclosure, satellite terminal cable link security between an indoor unit and an outdoor IP Radio may be provided by computer system 1300 in response to processor 1304 executing an arrangement of instructions contained in main memory 1306. Such instructions can be read into main memory 1306 from another computer-readable medium, such as storage device 1310. Execution of the arrangement of instructions contained in main memory 1306 causes processor 1304 to perform one or more processes described herein. One or more processors in a multi-processing arrangement may also be employed to execute the instructions contained in main memory 1306. In alternative embodiments, hard-wired circuitry is used in place of or in combination with software instructions to implement various embodiments. Thus, embodiments described in the present disclosure are not limited to any specific combination of hardware circuitry and software.

Computer system 1300 may also include a communication interface 1318 coupled to bus 1302. Communication interface 1318 can provide a two-way data communication coupling to a network link 1320 connected to a local network 1322. Wired and/or wireless links may be implemented. In any such implementation, communication interface 1318 sends and receives electrical, electromagnetic, or optical signals that carry digital data streams representing various types of information.

Network link 1320 may provide data communication through one or more networks to other data devices. By way of example, network link 1320 can provide a connection through local area network 1322 to network devices, for example including a host computer (PC) 1324, a smartphone 1326, and the like. Local area network 1322 may both use electrical, electromagnetic, or optical signals to convey information and instructions. The signals through the various networks and the signals on network link 1320 and through communication interface 1318, which communicate digital data with computer system 1300, are example forms of carrier waves bearing the information and instructions.

Computer system 1300 may send messages and receive data, including program code, through the network(s), network link 1320, and communication interface 1318. In the Internet example, a server (not shown) might transmit requested code belonging to an application program for implementing an embodiment of the present disclosure through local network 1322 and communication interface 1318. Processor 1304 executes the transmitted code while being received and/or store the code in storage device 1310, or other non-volatile storage for later execution. In this manner, computer system 1300 obtains application code in the form of a carrier wave.

Computer system 1300 includes equipment for communication with an external communications network. In particular, the computer system 1300 may include a transmit-side physical-layer device (TX PHY) 1331, a receive-side physical-layer device (RX PHY) 1332, a transmit-side media access controller (TX MAC) 1333, and a receive-side media access controller (RX MAC) 1334. Transmit packets may be provided to the TX MAC 1333 and TX PHY 1331, which provide corresponding signals to the external communications network 1350. For example, in a satellite communications network, TX MAC may be a TX satellite link controller (SLC), and TX PHY 1331 may provide corresponding signals to a satellite using a terrestrial antenna/dish. Signals received from an external communications network 1350 may be received via RX PHY 1332 and RX MAC 1334, from which receive packets may be obtained.

Figure 5:
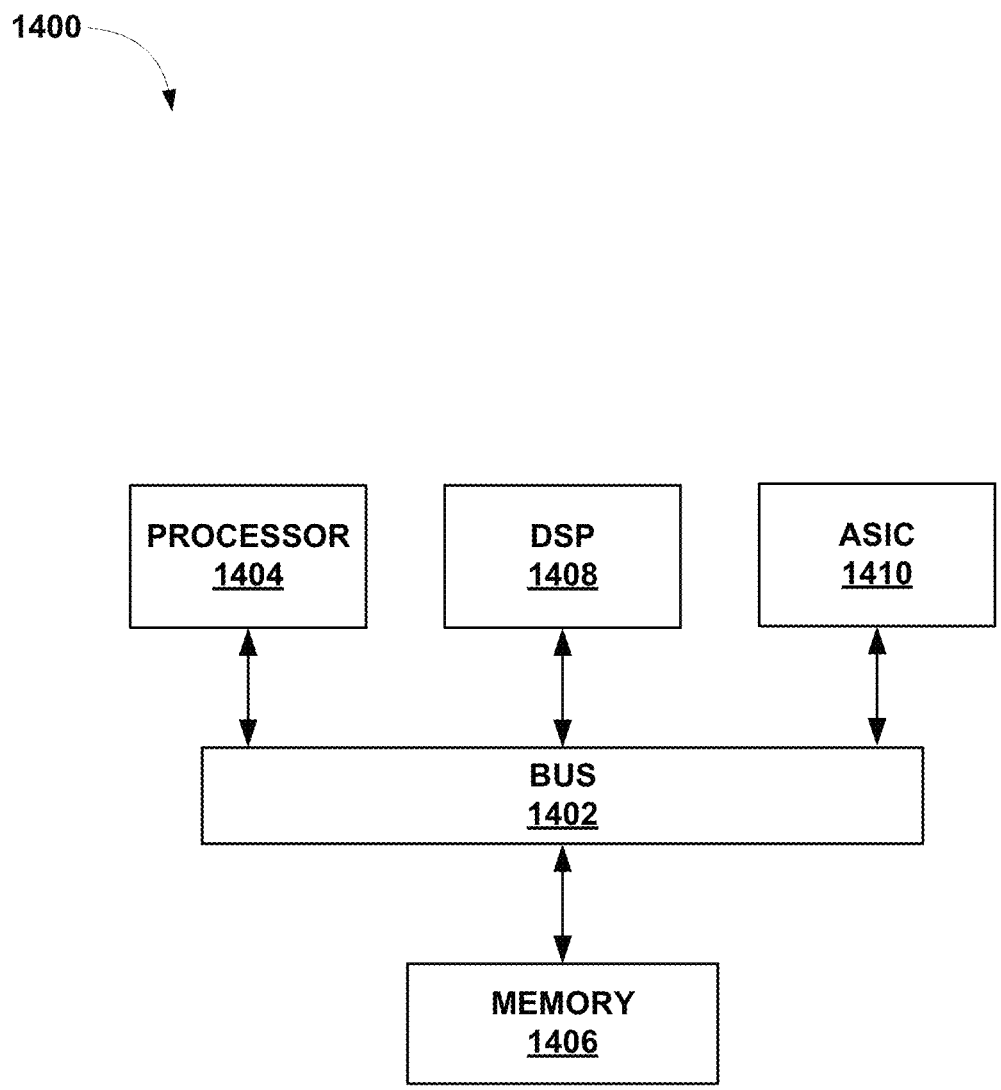
FIG. 5 illustrates a chip set in which embodiments of the disclosure may be implemented.

FIG. 5 illustrates a chip set 1400 in which embodiments of the disclosure may be implemented. Chip set 1400 can include, for instance, processor and memory components described with respect to FIG. 2 or FIG. 4 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1400 includes a communication mechanism such as a bus 1002 for passing information among the components of the chip set 1400. A processor 1404 has connectivity to bus 1402 to execute instructions and process information stored in a memory 1406. Processor 1404 includes one or more processing cores with each core configured to perform independently. A multi-core processor enables multiprocessing within a single physical package. Examples of a multi-core processor include two, four, eight, or greater numbers of processing cores. Alternatively or in addition, processor 1404 includes one or more microprocessors configured in tandem via bus 1402 to enable independent execution of instructions, pipelining, and multithreading. Processor 1404 may also be accompanied with one or more specialized components to perform certain processing functions and tasks such as one or more digital signal processors (DSP) 1408, and/or one or more application-specific integrated circuits (ASIC) 1410. DSP 1408 can typically be configured to process real-world signals (e.g., sound) in real time independently of processor 1404. Similarly, ASIC 1410 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1404 and accompanying components have connectivity to the memory 1406 via bus 1402. Memory 1406 includes both dynamic memory (e.g., RAM) and static memory (e.g., ROM) for storing executable instructions that, when executed by processor 1404, DSP 1408, and/or ASIC 1410, perform the process of example embodiments as described herein. Memory 1406 also stores the data associated with or generated by the execution of the process.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   initializing, over an interfacility link (IFL) cable connecting an indoor unit of a satellite terminal and an outdoor Internet Protocol (IP) Radio of the satellite terminal, a communication link between the indoor unit and the outdoor IP Radio;
   authenticating, using the indoor unit and the outdoor IP Radio, the communication link between the indoor unit and the outdoor IP Radio over the IFL cable; and
   after authenticating the communication link, providing satellite internet service to the indoor unit via the outdoor IP Radio.

2. The method of claim 1, wherein authenticating the communication link, comprises: authenticating, using one or more security keys stored at the indoor unit and the outdoor IP Radio, the communication link between the indoor unit and the outdoor IP Radio over the IFL cable.

3. The method of claim 2, wherein:
   the one or more security keys are generated by a network management system (NMS) of a satellite communications network; and
   the method further comprises: after the one or more security keys are generated by the NMS, receiving and storing, at the outdoor IP Radio and the indoor unit, the one or more security keys.

4. The method of claim 3, wherein receiving, at the outdoor IP Radio and the indoor unit, the one or more security keys, comprises:
   receiving, at the outdoor IP Radio, a modulated and encoded signal transmitted over an outroute of the satellite communications network;
   demodulating and decoding the signal at the outdoor IP Radio to extract the one or more security keys; and
   transmitting, over the IFL cable, the one or more security keys from the outdoor IP Radio to the indoor unit.

5. The method of claim 3, wherein storing, at the outdoor IP Radio and the indoor unit, the one or more security keys, comprises: storing, at the outdoor IP Radio and the indoor unit, the one or more security keys at a time that the satellite terminal is commissioned and installed.

6. The method of claim 1, wherein authenticating the communication link, comprises:
   pinging, over the IFL cable, using the outdoor IP Radio, the indoor unit;

in response to pinging the indoor unit, receiving, at the outdoor IP Radio, a response message from the indoor unit; and confirming, at the outdoor IP Radio, using at least the response message, that the indoor unit is authorized to receive the satellite internet service via the outdoor IP Radio.

7. The method of claim 6, wherein confirming, at the outdoor IP Radio, using at least the response message, that the indoor unit is authorized to receive the satellite internet service via the outdoor IP Radio, comprises: confirming, using at least the response message and one or more security keys stored at the outdoor IP Radio, that the indoor unit is authorized to receive the satellite internet service via the outdoor IP Radio.

8. The method of claim 1, wherein authenticating the communication link, comprises: authenticating the communication link during power up of the indoor unit and the outdoor IP Radio.

9. The method of claim 1, wherein authenticating the communication link, comprises: periodically authenticating the communication link between the indoor unit and the outdoor IP Radio.

10. The method of claim 1, wherein the IFL cable is a coaxial cable.

11. A satellite terminal, comprising:
an indoor unit;
an outdoor Internet Protocol (IP) Radio;
one or more processors; and
one or more non-transitory computer-readable mediums having executable instructions stored thereon that, when executed by the one or more processors, cause the satellite terminal to perform operations, comprising:
  initializing, over an interfacility link (IFL) cable connecting the indoor unit and the outdoor IP Radio, a communication link between the indoor unit and the outdoor IP Radio;
  authenticating, using the indoor unit and the outdoor IP Radio, the communication link between the indoor unit and the outdoor IP Radio over the IFL cable; and
  after authenticating the communication link, providing satellite internet service to the indoor unit via the outdoor IP Radio.

12. The satellite terminal of claim 11, wherein authenticating the communication link, comprises: authenticating, using one or more security keys stored at the indoor unit and the outdoor IP Radio, the communication link between the indoor unit and the outdoor IP Radio over the IFL cable.

13. The satellite terminal of claim 12, wherein:
the one or more security keys are generated by a network management system (NMS) of a satellite communications network; and
the operations further comprise: after the one or more security keys are generated by the NMS, receiving and storing, at the outdoor IP Radio and the indoor unit, the one or more security keys.

14. The satellite terminal of claim 13, wherein receiving, at the outdoor IP Radio and the indoor unit, the one or more security keys, comprises:

receiving, at the outdoor IP Radio, a modulated and encoded signal transmitted over an outroute of the satellite communications network;

demodulating and decoding the signal at the outdoor IP Radio to extract the one or more security keys; and transmitting, over the IFL cable, the one or more security keys from the outdoor IP Radio to the indoor unit.

15. The satellite terminal of claim 13, wherein storing, at the outdoor IP Radio and the indoor unit, the one or more security keys, comprises: storing, at the outdoor IP Radio and the indoor unit, the one or more security keys at a time that the satellite terminal is commissioned and installed.

16. The satellite terminal of claim 11, wherein authenticating the communication link, comprises:
pinging, over the IFL cable, using the outdoor IP Radio, the indoor unit;
in response to pinging the indoor unit, receiving, at the outdoor IP Radio, a response message from the indoor unit; and
confirming, at the outdoor IP Radio, using at least the response message, that the indoor unit is authorized to receive the satellite internet service via the outdoor IP Radio.

17. The satellite terminal of claim 16, wherein confirming, at the outdoor IP Radio, using at least the response message, that the indoor unit is authorized to receive the satellite internet service via the outdoor IP Radio, comprises: confirming, using at least the response message and one or more security keys stored at the outdoor IP Radio, that the indoor unit is authorized to receive the satellite internet service via the outdoor IP Radio.

18. The satellite terminal of claim 11, wherein authenticating the communication link, comprises: authenticating the communication link during power up of the indoor unit and the outdoor IP Radio; or periodically authenticating the communication link between the indoor unit and the outdoor IP Radio.

19. The satellite terminal of claim 11, wherein the satellite terminal is a very small aperture terminal (VSAT).

20. An outdoor Internet Protocol (IP) Radio of a satellite terminal, the outdoor IP Radio comprising:
one or more processors; and
one or more non-transitory computer-readable mediums having executable instructions stored thereon that, when executed by the one or more processors, cause the outdoor IP Radio to perform operations, comprising:
  initializing, over an interfacility link (IFL) cable connecting the outdoor IP Radio to an indoor unit of the satellite terminal, a communication link between the outdoor IP Radio and the indoor unit;
  authenticating the communication link between the indoor unit and the outdoor IP Radio over the IFL cable; and
  after authenticating the communication link, providing satellite internet service to the indoor unit.

* * * * *